(12) United States Patent
Briese

(10) Patent No.: US 10,837,224 B2
(45) Date of Patent: Nov. 17, 2020

(54) CONVEYOR AND METHOD OF MANUFACTURE

(71) Applicant: GED INTEGRATED SOLUTIONS, INC., Glenwillow, OH (US)

(72) Inventor: William Briese, Hinckley, OH (US)

(73) Assignee: GED Integrated Solutions, Inc., Glenwillow, OH (US)

( * ) Notice: Subject to any disclaimer, the term of this patent is extended or adjusted under 35 U.S.C. 154(b) by 0 days.

(21) Appl. No.: 16/254,197

(22) Filed: Jan. 22, 2019

(65) Prior Publication Data
US 2019/0226271 A1 Jul. 25, 2019

Related U.S. Application Data

(60) Provisional application No. 62/758,856, filed on Nov. 12, 2018, provisional application No. 62/620,118, filed on Jan. 22, 2018.

(51) Int. Cl.
| | |
|---|---|
| *E06B 3/673* | (2006.01) |
| *E06B 3/663* | (2006.01) |
| *C03C 27/10* | (2006.01) |
| *E06B 3/66* | (2006.01) |

(52) U.S. Cl.
CPC .......... *E06B 3/67339* (2013.01); *C03C 27/10* (2013.01); *E06B 3/66352* (2013.01); *E06B 3/6612* (2013.01)

(58) Field of Classification Search
CPC combination set(s) only.
See application file for complete search history.

(56) References Cited

U.S. PATENT DOCUMENTS

| 4,983,146 A | * | 1/1991 | Charles | ................. | B82Y 15/00 |
| | | | | | 399/288 |
| 6,245,383 B1 | * | 6/2001 | Hamabe | ................ | B29B 15/122 |
| | | | | | 427/211 |
| 6,352,150 B1 | * | 3/2002 | Lewis | .................... | B65G 15/38 |
| | | | | | 198/846 |
| 6,459,877 B1 | * | 10/2002 | Yoda | .................. | G03G 15/2064 |
| | | | | | 219/216 |
| 7,048,964 B2 | | 5/2006 | McGlinchy | | |
| 7,448,246 B2 | | 11/2008 | Briese et al. | | |
| 2004/0166270 A1 | * | 8/2004 | Yoshida | .................. | B29C 41/22 |
| | | | | | 428/36.91 |
| 2004/0218950 A1 | * | 11/2004 | Gogate | ............. | G03G 15/2057 |
| | | | | | 399/329 |

(Continued)

*Primary Examiner* — Sing P Chan
(74) *Attorney, Agent, or Firm* — Tarolli, Sundheim, Covell & Tummino LLP; John A. Yirga, Esq.

(57) ABSTRACT

A conveyor belt for use in applying sealant to an elongated spacer frame and a method of use. The conveyor belt comprising a reversible belt rotatably attached to first and second pulleys. The reversible belt having a first perimeter length. The reversible belt is removably attached to the first and second pulleys. A first side and a second side of the replacement belt include first and second adhesive resistant materials. The first and second adhesive resistant materials are separated by an elastic support layer, wherein the first perimeter length is shorter than a second perimeter length measured about the rotation path of the first and second pulleys. The elastic support layer applies a force to first and second pulleys such that the reversible belt does not slip relative to the first and second pulleys.

22 Claims, 16 Drawing Sheets

(56) References Cited

U.S. PATENT DOCUMENTS

| | | |
|---|---|---|
| 2008/0286077 A1 | 11/2008 | McGlinchy |
| 2010/0314039 A1* | 12/2010 | Kamoi ................. B29C 65/526 156/258 |
| 2017/0074030 A1 | 3/2017 | Briese |
| 2017/0308011 A1* | 10/2017 | Koga ................. G03G 15/2057 |
| 2018/0284665 A1* | 10/2018 | Mukoyama ........ G03G 15/2057 |
| 2019/0226271 A1* | 7/2019 | Briese ................. E06B 3/67339 |

* cited by examiner

CONVEYOR AND METHOD OF MANUFACTURE

CROSS REFERENCES TO RELATED APPLICATIONS

The following application claims priority under 35 U.S.C. 119(e) to U.S. Provisional Patent Application Ser. No. 62/758,856 filed Nov. 12, 2018 entitled CONVEYOR AND METHOD OF MANUFACTURE and U.S. Provisional Patent Application Ser. No. 62/620,118 filed Jan. 22, 2018 entitled CONVEYOR AND METHOD OF MANUFACTURE. The above-identified provisional applications are incorporated herein by reference in their entireties for all purposes.

TECHNICAL FIELD

The present disclosure relates to a conveyor and method of manufacture, and more particularly, a multiple use conveyor for use with adhesive materials and a method of use and manufacture thereof.

BACKGROUND

Insulating glass units (IGUs) are used in windows to reduce heat loss from building interiors during cold weather. IGUs are typically formed by a spacer assembly sandwiched between glass lites. A spacer assembly usually comprises a spacer frame extending peripherally about the unit, an adhesive material (e.g., sealant) adhered both to the glass lites and the spacer frame, and a desiccant for absorbing atmospheric moisture within the unit. The adhesive extends continuously about the spacer frame periphery and its opposite sides so that the space within the IGUs is hermetic. The adhesive provides a barrier between atmospheric air and the IGU interior, which blocks entry of atmospheric water vapor.

One type of spacer construction employs a "U" or rectangular shaped, roll formed material that is bent and connected at its two ends to form a square or rectangular spacer frame. Opposite sides of the frame are covered with the adhesive (e.g., a hot melt material, such as sealant) for securing the frame to the glass lites. The adhesive provides a barrier between atmospheric air and the IGU interior, which blocks entry of atmospheric water vapor.

Typically, adhesive is applied around a majority of the spacer frame periphery before bending into a frame. An elongated spacer frame (e.g., a spacer frame that is not yet been bent) is transported along an extruder and/or conveyor belt while an adhesive is being applied to at least three sides of said elongated spacer frame. Conveyor belts are typically made of a non-stick material that resists binding to the adhesive, as the adhesive is highly adherent. The non-stick material of the conveyor belts fails, because they cease to be non-stick after a certain number of interactions with the adhesive (e.g., silicone degradation, resistance exhaustion, etc.). For example, during failure, the adhesive will stick to the extruder and/or conveyor belt rather than the elongated spacer frame, causing uneven adhesive application, which in turn increases a likelihood of window failure. Once adhesives begin to stick to the encoder belt, the entire belt has to be replaced. Because timing, spacing, and location of the elongated spacer frame is important to adhesive application thereof, the conveyor belts are typically reinforced to prevent stretching (stretching would cause the length of the belt to be variable, which would reduce efficiency and cause timing and/or spacing of the adhesive to be incorrect, as well as causing the conveyor belt to slip on one or more drive pulleys) and precisely tooled for accurate belt movement and speed. These conveyor belts are expensive compared to conventional belts, and have to be replaced in their entireties every few days to every few weeks because of the loss/wear on the non-stick surface of the belt.

The adhesive is typically applied around the periphery of the elongated spacer frame while leaving a small opening formed through the spacer frame uncovered, or free from sealant. The atmospheric air is evacuated and an inert gas is inserted into the space within the IGU. A rivet or screw is inserted into the opening, and additional adhesive is then applied over the uncovered area. Particulate desiccant is typically deposited inside the spacer frame and communicates with air trapped in the IGU interior to remove the entrapped airborne water vapor, and as such, precludes condensation within the unit. Thus, after the water vapor entrapped in the IGU is removed, internal condensation only occurs if the unit fails.

Such sealant issues are discussed in U.S. Pat. Pub. No. 2017/0071030 to Briese et al., which is assigned to the assignee of the present disclosure and is incorporated herein by reference. Sealant dispensing, utilizing a sealant metering pump, is discussed in further detail in U.S. Pat. No. 7,048,964, to McGlinchy et al., which is assigned to the assignee of the present disclosure and is incorporated herein by reference. Additionally, U.S. Pat. Pub. No. 2008/0286077 to McGlinchy and U.S. Pat. No. 7,448,246 to Briese et al., which are assigned to the assignee of the present disclosure, are incorporated herein by reference.

SUMMARY

One example embodiment of the present disclosure includes a conveyor belt for use in applying sealant to an elongated spacer frame comprising a reversible belt removably attachable to a first and second pulleys, wherein responsive to being attached, the reversible belt is rotatably attached to the first and second pulleys, wherein the reversible belt comprises first and second sides configured to be in contact with the first and second pulleys, the first side comprising a first adhesive resistant material and a second side comprising a second adhesive resistant material, the first and second adhesive resistant materials are separated by an elastic support layer, wherein the reversible belt comprises a second perimeter length that is shorter than a first perimeter length of a rotation path around the first and second pulleys, further wherein the elastic support layer is configured to apply a force to the first and second pulleys such that the reversible belt does not slip relative to the first and second pulleys when in use.

Another example embodiment of the present disclosure includes a conveyor belt system for use in applying sealant to an elongated spacer frame comprising a first rotatable pulley and a second rotatable pulley defining a rotation path around the first and second rotatable pulleys. The rotation path includes a first perimeter length; and a reversible belt for supporting and transporting an elongated spacer frame along a linear path when attached to the first and second pulleys during use. The reversible belt is removably attachable to the first and second pulleys, wherein responsive to being attached, the reversible belt is rotatably attached to the first and second pulleys, wherein the reversible belt comprises first and second sides configured to be in contact with the first and second pulleys, the first side comprises a first adhesive resistant material and a second side comprises a second adhesive resistant material being the same as the first adhesive material, the first and second adhesive resistant materials are separated by an elastic support layer, wherein the reversible belt comprises a second perimeter diameter that is shorter than a first perimeter diameter, further wherein the elastic support layer is configured to apply a force to the first and second pulleys such that the reversible belt does not slip relative to the first and second pulleys when in use.

While yet another example embodiment of the present disclosure includes a method of forming a conveyor belt system for use in applying sealant to an elongated spacer frame. The method comprises: forming an elastic support layer; integrally forming a reversible belt having a first and second adhesive resistant materials separated by the elastic support layer, the first adhesive resistant material on a first side of the elastic support layer and the second adhesive resistant material on a second side of the elastic support layer. The reversible belt is removably attachable to first and second pulleys, wherein responsive to being attached, the reversible belt is rotatably attached to the first and second pulleys, wherein the first side is in contact with the first and second pulleys, further the reversible belt for supporting and transporting an elongated spacer frame on the reversible belt along a linear path when attached to the first and second pulleys during use.

BRIEF DESCRIPTION OF THE DRAWINGS

The foregoing and other features and advantages of the present disclosure will become apparent to one skilled in the art to which the present invention relates upon consideration of the following description of the invention with reference to the accompanying drawings, wherein like reference numerals refer to like parts unless described otherwise throughout the drawings and in which.

Figure 1:
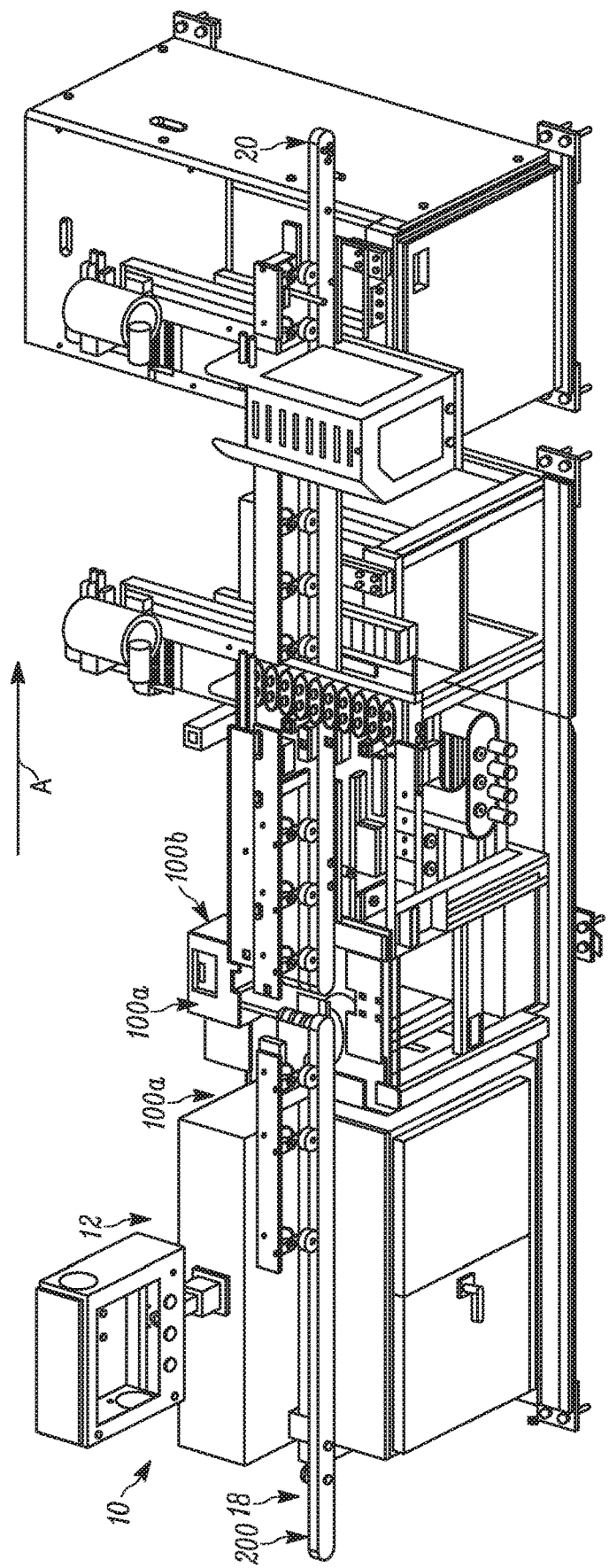
FIG. 1 is a perspective view of an adhesive processing system.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

The apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

Referring now to the figures generally wherein like numbered features shown therein refer to like elements throughout unless otherwise noted. The present disclosure relates to a conveyor and method of manufacture, and more particularly, a multiple use conveyor for use with adhesive materials and a method of use and manufacture thereof.

FIG. 1 schematically depicts an adhesive processing system 10 for applying adhesive (e.g., such as sealant or other hot melt materials) for sealing window frames or insulating glass units (hereinafter IGUs 600, see FIGS. 14-16). The adhesive processing system 10 comprises a programmable interface 12, and one or more conveyor or extruder belt portions 100a, 100b that transport one or more elongated spacer frames 201, before bending through the system. An elongated spacer frame 201 (see FIG. 16) is placed at an entry end 18 of the adhesive processing system 10 and transported along the one or more conveyor belt portions 100a, 100b to an exit end 20 along direction A (e.g., in a longitudinal direction), where within the system adhesive (e.g., sealant or the like) is applied to at least three sides (for example, lateral walls 22, 26 and peripheral wall 24 illustrated in FIG. 17) of the elongated spacer frame 201.

Figure 2:
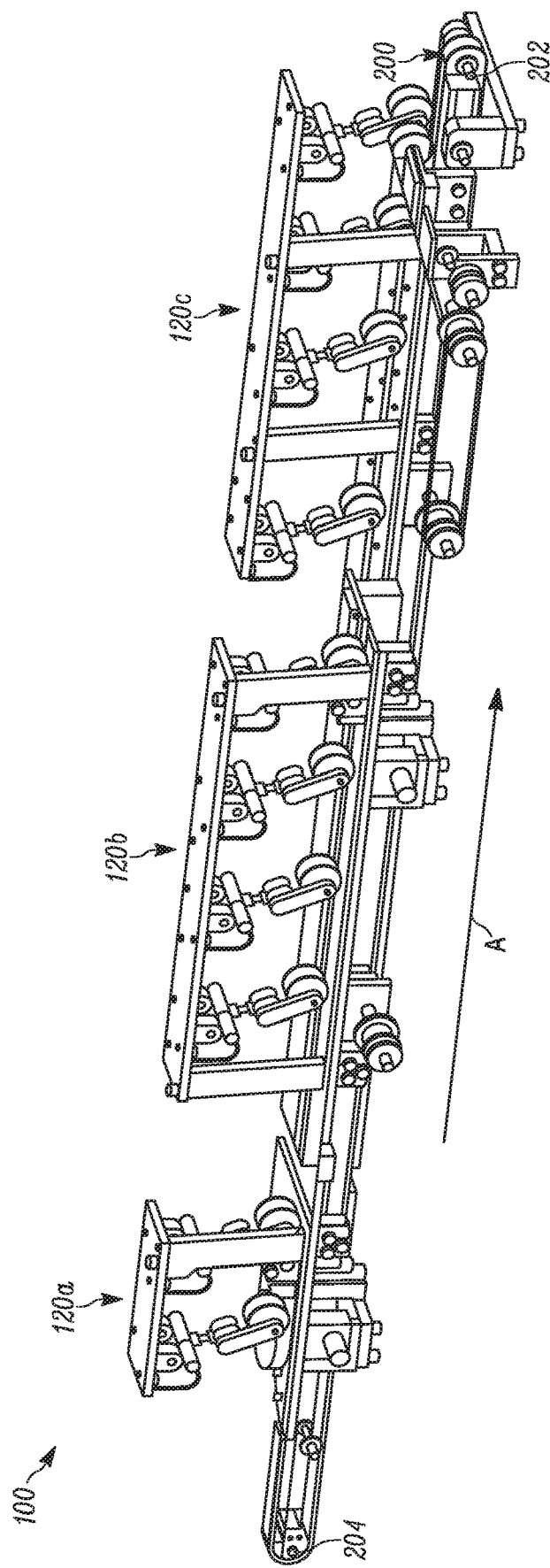
FIG. 2 is a right-side perspective view of a two-part conveyor belt of an adhesive processing system.
Figure 3:
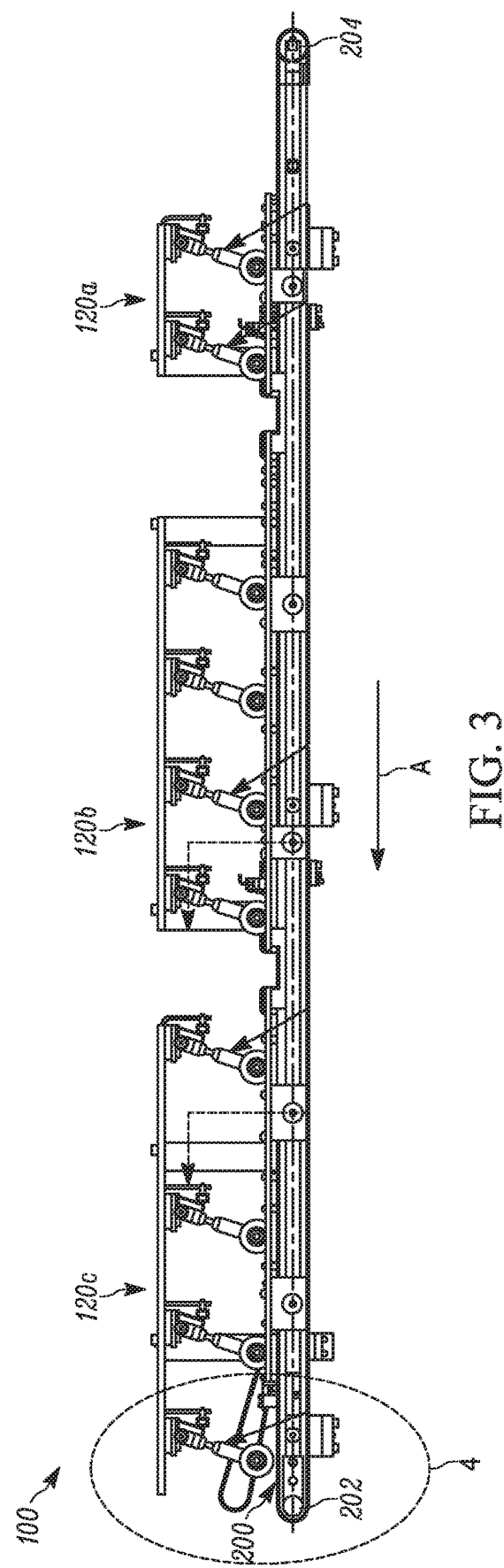
FIG. 3 is a left side elevation view of the two-part conveyor belt of FIG. 2.
Figure 4:
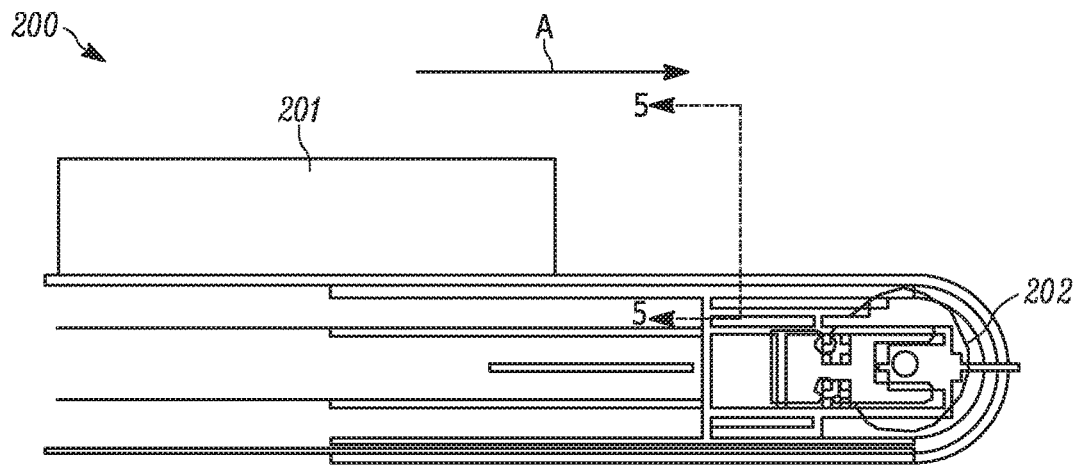
FIG. 4 is a magnified view of a portion of circle 4 of FIG. 3.

As illustrated in FIGS. 2-4, a conveyor belt system 100 comprises one or more groups of soft contact rollers 120a, 120b, 120c that are positioned to interact with the elongated spacer frame 201 that is being transported along a belt, such as a two-part or two-tooled belt 200 that is rotated via one or more pulleys 202, 204. Adhesive is applied to the elongated spacer frame 201, by a sealant applicator (e.g., a device that dispenses adhesive) as the frame is being transported between the entry end 18 and the exit end 20 of the conveyor belt system 100. Ideally, the conveyor belt 200 retains no adhesive when the elongated spacer frame is removed, automatically or manually, from the exit end 20.

Figure 14:
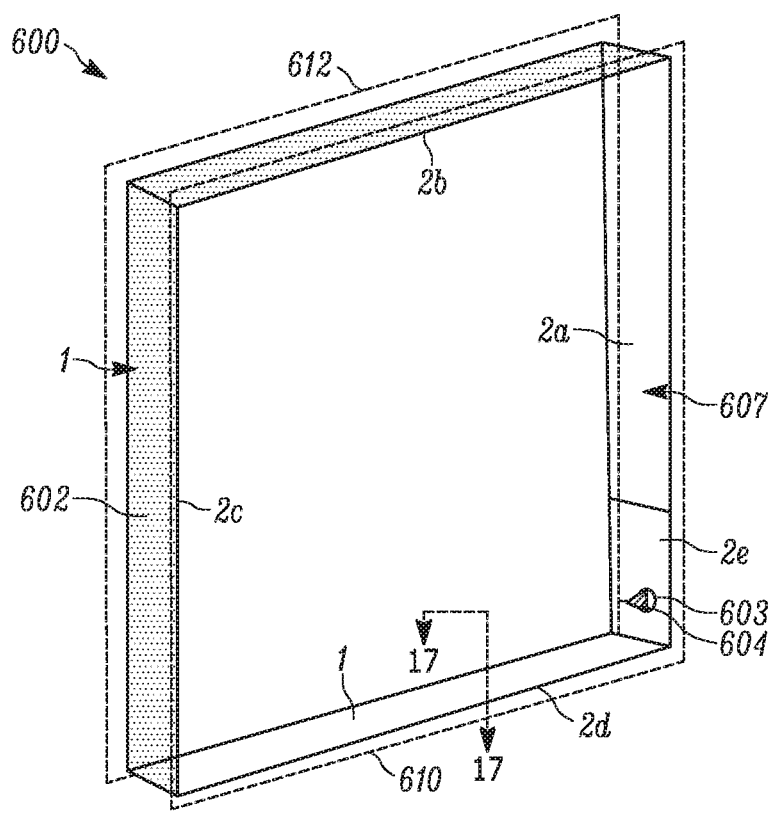
FIG. 14 is a schematic diagram of an insulating glass unit (IGU) according to one example embodiment of the present disclosure.
Figure 15:
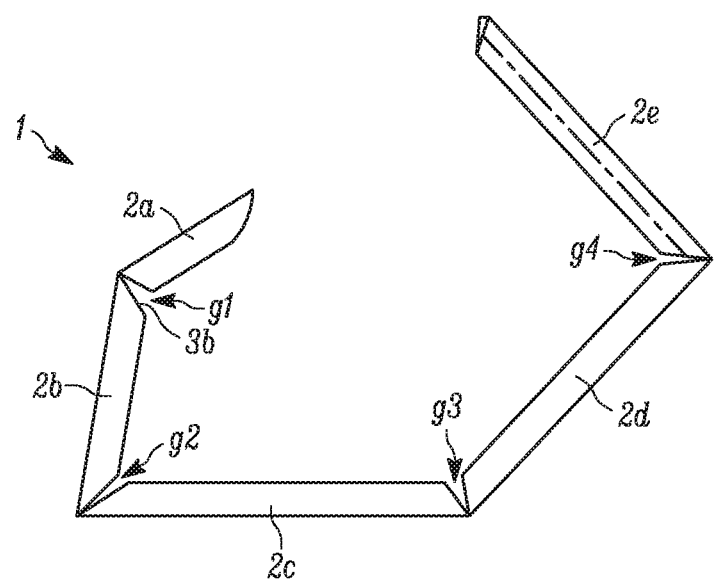
FIG. 15 is a schematic diagram of a spacer frame being bent according to one example embodiment of the present disclosure.
Figure 16:
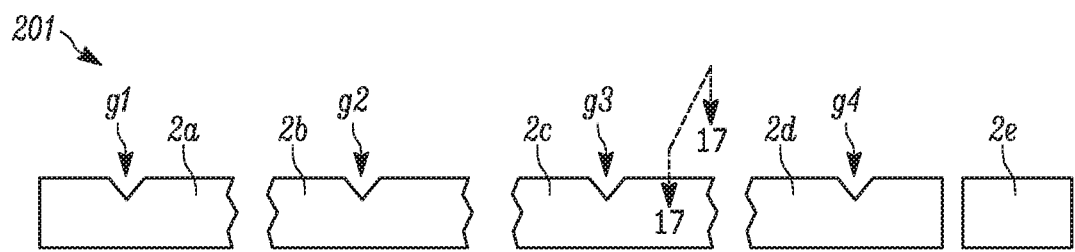
FIG. 16 is a schematic diagram of an elongated spacer frame according to one example embodiment of the present disclosure.
Figure 17:
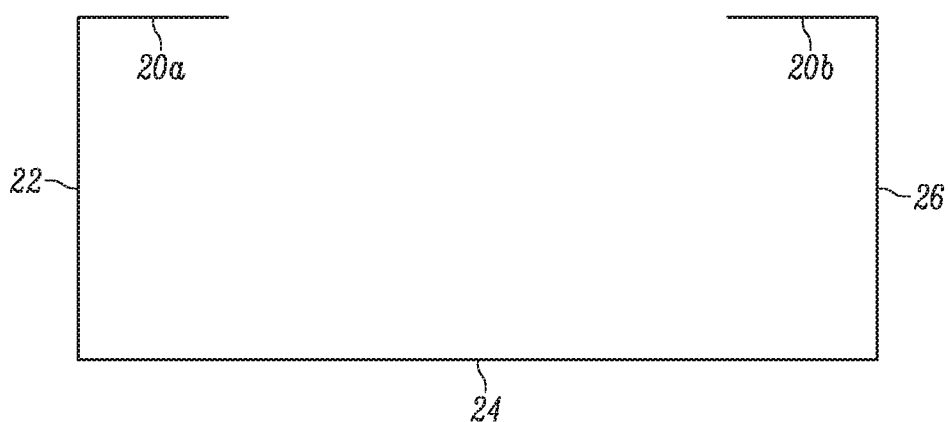
FIG. 17 a section view of FIG. 14 taken along section lines 15-15 illustrating a U shape of an elongated spacer frame, according to the third embodiment of the present disclosure.

The elongated spacer frames 201 comprising adhesive 602 along at least three sides are then bent to form a spacer frame 1 (see FIGS. 14-16). Additionally, shown in the illustrated example embodiments of FIGS. 14-16, is the conventional spacer frame 1 fabricated for IGUs 600. The conventional spacer frame 1 is typically fabricated from an elongated spacer frame 201, which is roll formed into the orientation shown (see FIG. 5).

The conventional spacer frame 1 includes five different legs, 2a, 2b, 2c, 2d, and 2e that are manually bent into the configuration shown in FIG. 15 to become the rectangle or squire for a door or window as illustrated in FIG. 14. In FIG. 15, leg 2a is a tab that when the spacer frame is assembled is inserted into leg 2e to form a connection. Legs 2b-2e make up the four sides of the spacer frame. After adhesive from the adhesive processing system 10 is applied to the elongated spacer frame 201, the spacer frame 1 is automatically or manually bent from the linear elongated spacer frame into the four-sided frame. In the assembled position, the conventional spacer frame 1 includes four corners g1, g2, g3, and g4, although more corners and sides are contemplated.

During assembly at the adhesive processing system 10, sealant 602 is applied and cures around the elongated spacer frame 201. An opening 603 through the spacer frame 1 is left uncovered. The elongated spacer frame 201 is then bent into the frame shape 1 and glass lites 610, 612 are adhered to the frame 1. More than one glass lite and more than one spacer frame are contemplated to form multi-pane IGUs. Atmospheric air is evacuated and an inert gas is inserted into the space 607 within the IGU 600 (e.g., bounded by the spacer frame 1 and glass lites 610, 612). A rivet, screw, cover, or other fastener 604 is inserted into the opening 603, and additional adhesive is applied over the uncovered area.

As illustrated in FIGS. 5-13, the two-part conveyor belt 200 comprises a geared, non-stretch belt, herein "the geared belt" 212 that is in functional contact with the pulleys 202, 204 and a replacement belt 205 that is positioned over the geared belt, such that the geared belt is between the pulleys and the replacement belt. In one example embodiment, the geared belt 212 is self-tracking and reinforced, such that the geared belt does not stretch or become misaligned. The geared belt 212 comprises an endless belt (e.g., it is formed without a seam).

Figure 6:
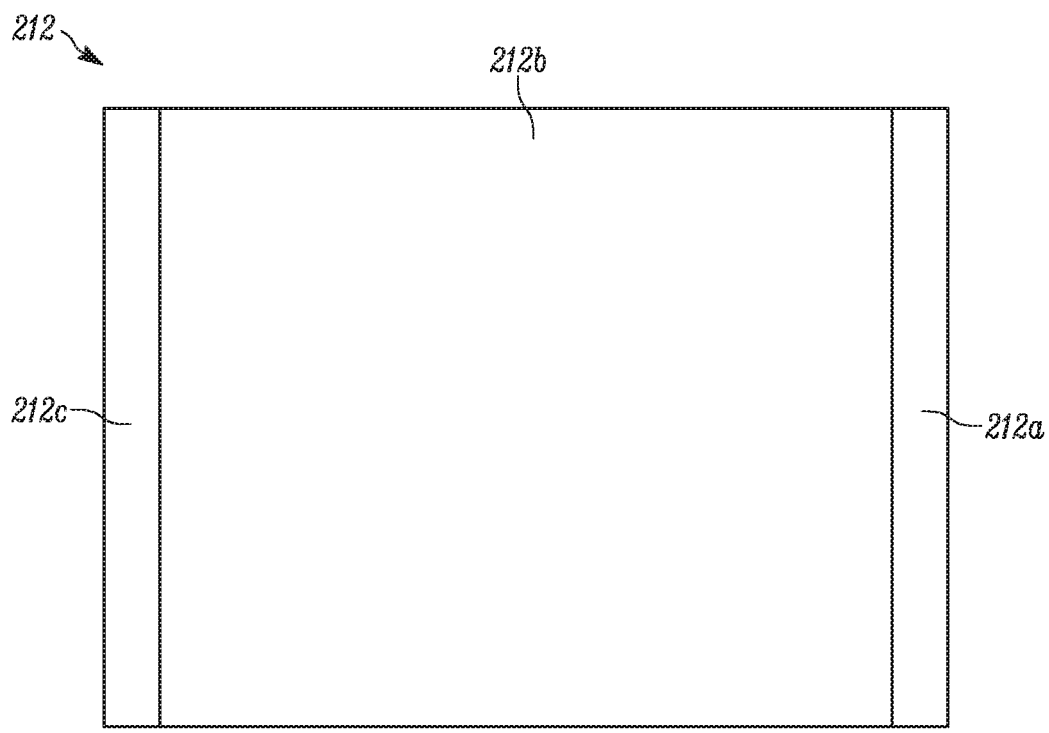
FIG. 6 is a top view of a geared belt conveyor belt of FIG. 4 according to the first embodiment of the present disclosure.
Figure 7:
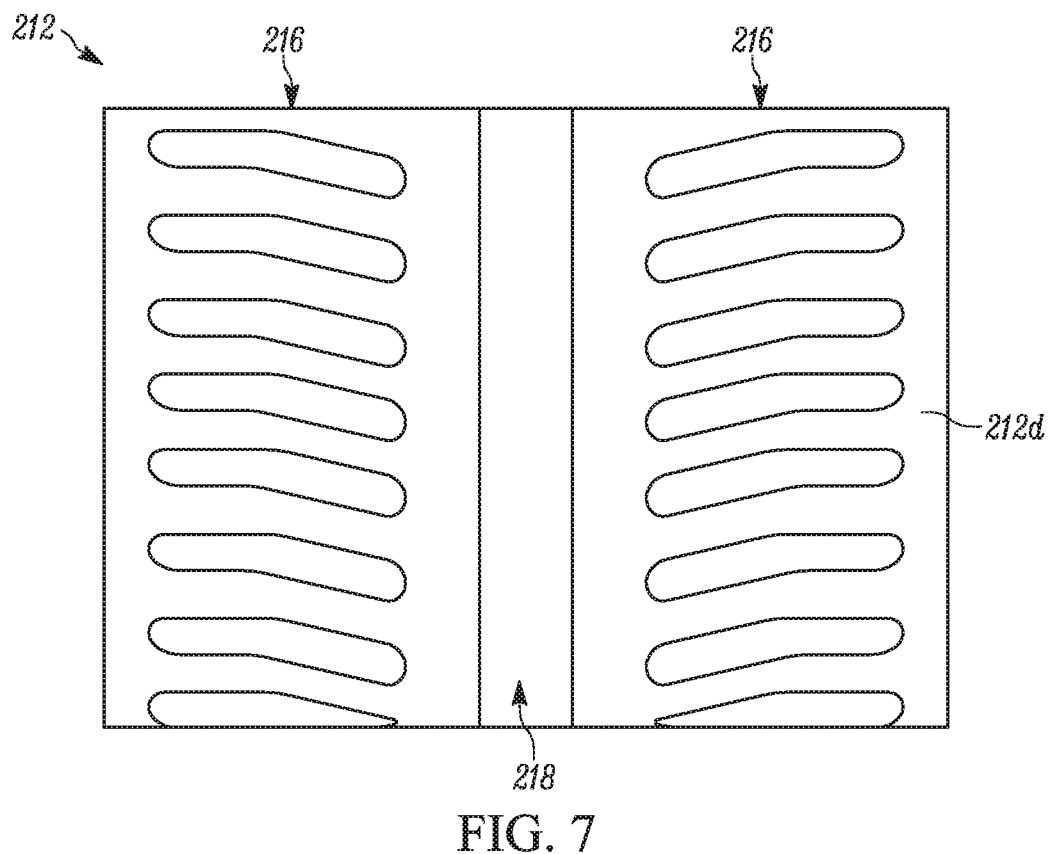
FIG. 7 is a bottom view of a geared belt of FIG. 4 according to the first embodiment of the present disclosure.

Illustrated in FIGS. 6 and 7, the geared belt 200 comprises a top surface 212b and a bottom surface 212d. The bottom surface 212d comprises one or more treads 216 spaced laterally from each other by a central gap 218, wherein the one or more treads 216 protrude a set distance that is configured to interact with one or more treads on the pulleys 202, 204. While multiple pulleys are contemplated, an example pulley is -BP52X012495 from BrecoFlex. Additionally, while the one or more treads 216 separated by the central gap 218 are illustrated, other tread configurations that are configured to interact with multiple pulleys are contemplated. The geared belt 212 is reinforced, with, for example, metal, plastics, etc., such that the geared belt retains its length and shape while rotating around the pulleys 202, 204.

Figure 13A:
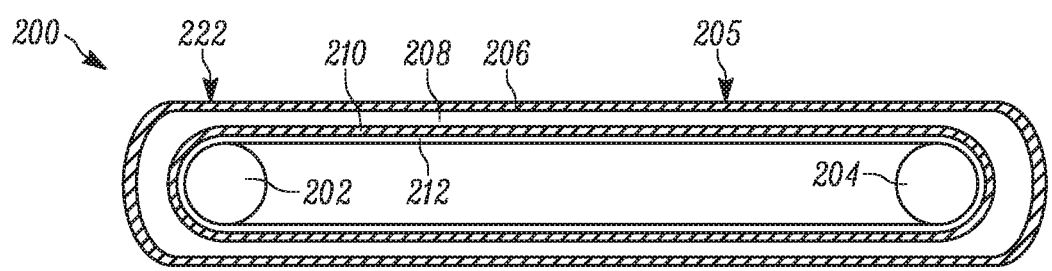
FIG. 13A is a schematic diagram of a two-part conveyor belt rotatably attached to two pulleys according to one example embodiment of the present disclosure.
Figure 13B:
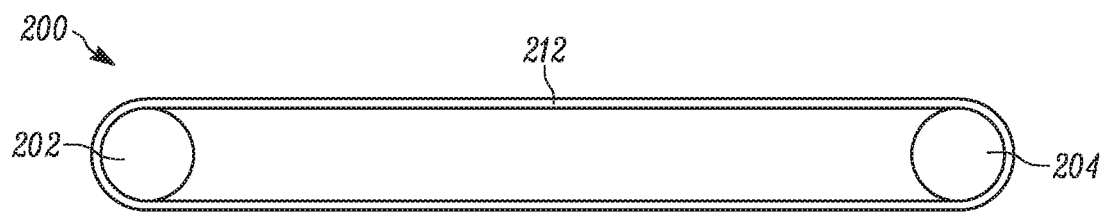
FIG. 13B is a schematic diagram of a gear belt of a two-part conveyor belt rotatably attached to two pulleys according to one example embodiment of the present disclosure.
Figure 13C:
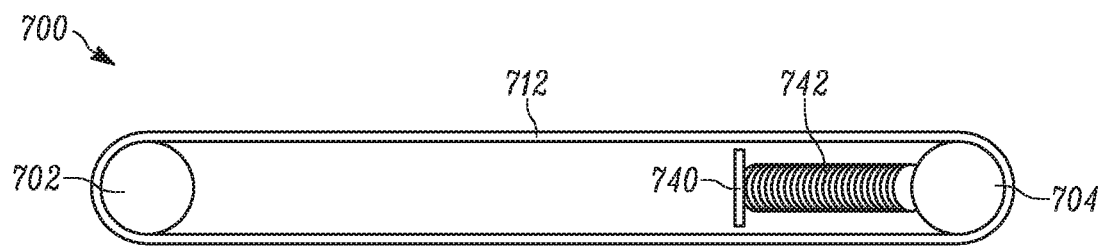
FIG. 13C is a schematic diagram of a belt of a two-part conveyor belt rotatably attached to two pulleys according to one example embodiment of the present disclosure.

Referring now to FIG. 13C, an example embodiment of the two-part belt 700, and specifically the non-geared belt 712 is shown. Features of the two-part belt 700 illustrated in FIG. 13C that are similar to the features of the two-part belt 200 illustrated in FIGS. 5-7 and 13A-13B will be identified by like numerals increased by a factor of six-hundred. Illustrated in FIG. 13C, an example embodiment of a two-part belt 700 utilizing a non-geared belt 712 connected (e.g., driven by tension applied to the belt) to a drive pulley 702 and a tension pulley 704. The non-geared belt 712 is frictionally rotatable about the drive pulley 702, which rotates via an engine or other motor, and the tension pulley 704, which rotates via an engine, other motor, or as an idler pulley by the torque transferred from the drive pulley 702 via the non-geared belt 712. In the illustrated embodiment, the tension pulley 704 is connected to a tension device 742 (e.g., a spring, hydraulic device, or other source of tension) that is coupled to a stationary slat 740, which provides a base to apply tension to the tension pulley 704. The tension device 742 pushes the tension pulley 704 such that the tension pulley extends away from the drive pulley 702 to maintain tension on the non-geared belt 712. The non-geared belt 712 is substantially the same as the geared belt 212, except that the non-geared belt is driven by tension and not the gearing beneath the belt.

Figure 5:
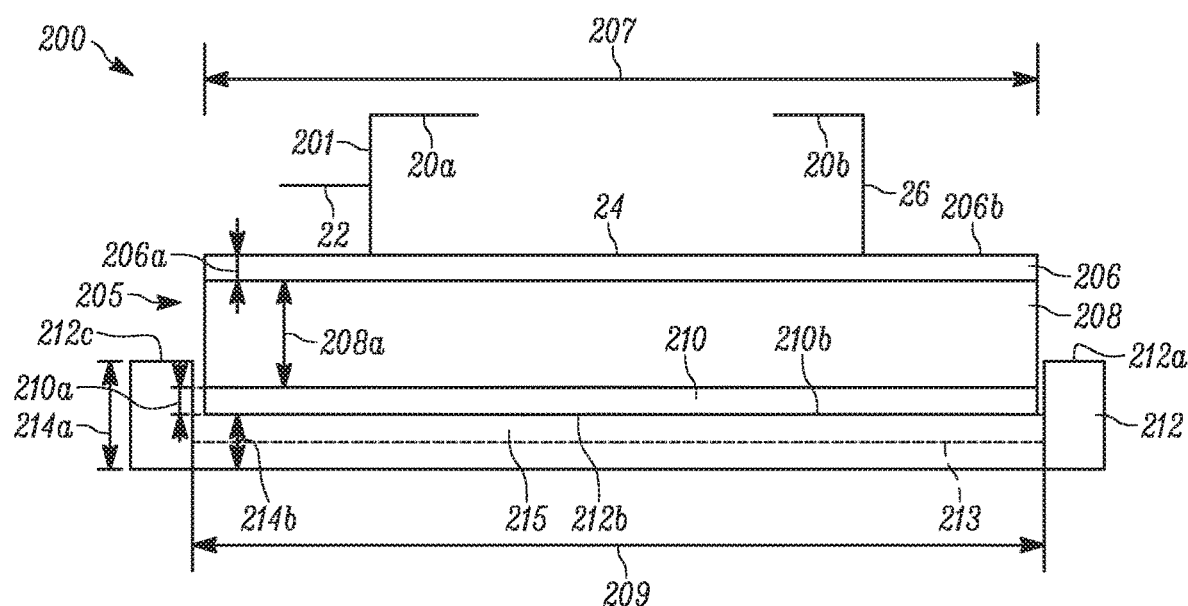
FIG. 5 is a section view the two-part conveyor belt of FIG. 4 taken along section lines 5-5 according to a first embodiment of the present disclosure.

In a first example embodiment illustrated in FIGS. 5 and 6, the top portion 212b comprises a central portion 215 adjacent two lips 212a, 212c, wherein the lips extend longitudinally parallel to the treads and/or along direction A. In one example embodiment, the lips 212a, 212c have a lip height 214a of between about 1-5 mm, and the central portion 215 has a central height 214b of between about 0.5 mm to about 4 mm. A central width 209 of the central portion 212b is between 0.2 mm-1 mm greater than a replacement width 207 of the replacement belt 205. In one example embodiment, the central width 209 is between 30 mm-40 mm and the replacement width 207 is between 29.8 mm-40.2 mm. In this example embodiment, the central portion 212b has a top material 213 that comprises a non-slip surface material, such as silicone or the like.

As illustrated in the first example embodiment of FIG. 5, the replacement belt 205 is elastically situated between the lips 212a, 212c. In this embodiment, the replacement belt 205 comprises an endless belt or a jointed belt (discussed in more detail below). The replacement belt 205 comprises first and second adhesive resistant materials 206, 210 spaced from each other and connected by a support layer 208. In one example embodiment, the first and second adhesive resistant materials 206, 210 comprise one of silicone, Polytetrafluoroethylene (e.g. Teflon®), etc. In one example embodiment, the support layer 208 comprises a foam-like or resilient material, such as urethane. In another example embodiment, the support layer 208 comprises a rubber or plastic material. In yet another example embodiment, the support layer is a composite of a fibrous material and a polymer.

The support layer 208 has a support width 208a between about 0.1 mm to about 1 mm. The first and second adhesive resistant layers 206, 210 have first and second resistant widths 206a, 210a between about 0.01 mm to about 1 mm. The replacement belt 205 has elastic qualities, such that the replacement belt stretches an additional 1% to 10% of the replacement belt's initial length. The replacement belt 205 returns to its original length absent a force stretching the replacement belt. The replacement belt 205 and/or the geared belt 212 are formed via one of co-extrusion, molding, mandrel cut, endless manufacturing, etc. Where the various materials are incorporated into the formation.

A first contact side 210b of the replacement belt 205 is in direct contact with central portion 215 of the geared belt 212. A second contact side 206b, opposite the first contact side, supports and transports the elongated spacer frame 201 during adhesive application. In the illustrated example embodiment of FIG. 5, the replacement belt 205 has the first and second adhesive resistant materials 206, 210 on the first and second contact sides 210b, 206b, respectively. In another example embodiment, the first adhesive resistant material 206 is present, but the second adhesive resistant material 210 is absent. In one example embodiment, the first and second adhesive resistant materials 206, 210 comprises a non-slip (e.g., grips the geared belt 212), non-stick (e.g., repels the adhesive) surface material, such as silicone or the like. The first and second adhesive resistant materials 206, 210 and the top material 213 are one of a same or different materials. In another example embodiment, the top material 213 and/or the second adhesive resistant material 210 comprise one of a one touch fabric, such as Velcro®, a removable adhesive, such as rubber cement, and/or some other type of temporary bonding agent.

The lips 212a, 212c retain the replacement belt 205 to a central location. Additionally, responsive to the geared belt 212 rotating, the replacement belt 205 rotates at a same speed, while maintaining a same location relative to the geared belt. The interaction of the second adhesive resistant material 210 with the top material 212b, as well as the grip created by the elasticity of the replacement belt 205 prevents slippage between the geared belt 212 and the replacement belt.

In the illustrated example embodiment of FIGS. 13A-13B, the replacement belt 205 is removable from and re-attachable to the geared belt 212. In one example embodiment, the replacement belt 205 is between 1% to 8% undersized as compared to a perimeter length of the geared belt 212. The replacement belt 205 is attached via snap action, wherein a first looped portion 222 is placed between the lips 212a, 212c of the geared belt 212 over a first pulley 202, and a force is exerted to stretch the replacement belt such that the replacement belt is placed between the lips of the geared belt over a second pulley 204. The elastic qualities and the undersized length will cause the replacement belt 205 to snap into place with sufficient tension to maintain the replacement belts position relative to the geared belt 212.

In the illustrated example embodiment of FIGS. 5, 6, and 13A, wherein the replacement belt 205 comprises both first and second adhesive resistant materials 206, 210, and the replacement belt is reversible. Stated another way, responsive to the first adhesive resistant material 206 undergoing adhesive exhaustion (e.g., no longer repelling the adhesive) the replacement belt 205 can be removed and reversed, such that the first adhesive resistant material is in contact with the geared belt 212 and the second adhesive material 210, which has not been repeatedly exposed to adhesive, and is not exhausted, faces outwardly and supports and moves the elongated spacer frame 201. Absent the second adhesive resistant material 210 being present, a new replacement belt may be added and placed over the geared belt 212.

Figure 8:
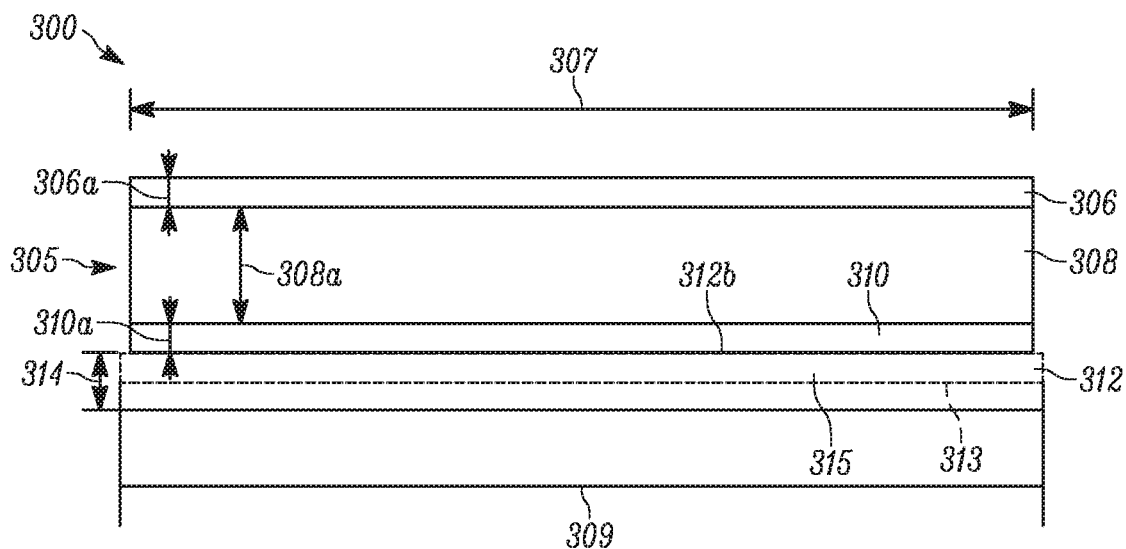
FIG. 8 is a section view of FIG. 4 taken along section lines 5-5 according to a second embodiment of the present disclosure.
Figure 9:
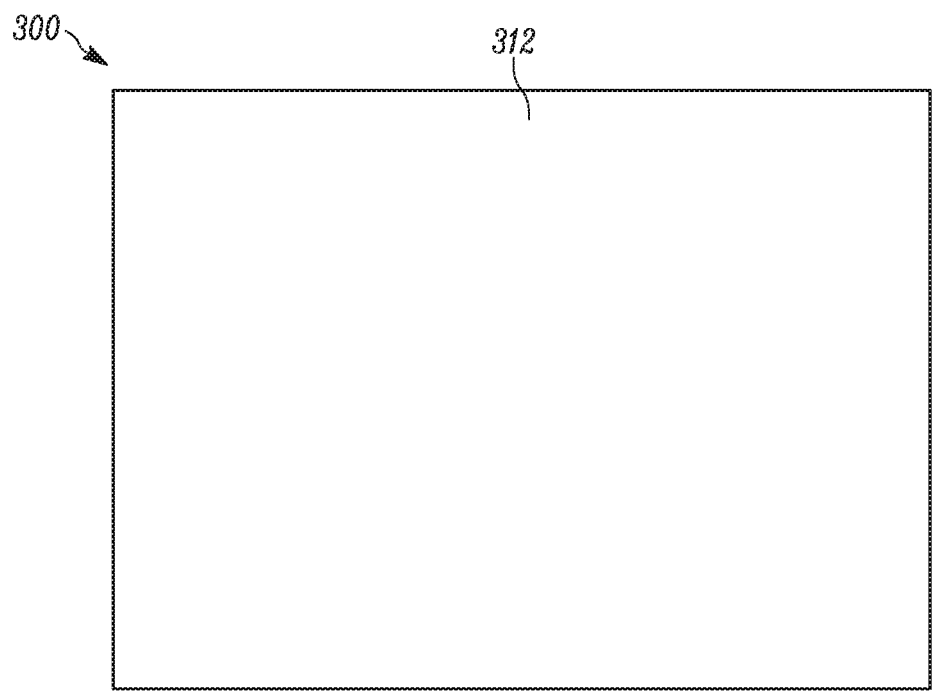
FIG. 9 is a top view of a geared belt of FIG. 4 according to the second embodiment of the present disclosure.

Referring now to FIGS. 8-9, a second example embodiment of the two-part belt 200, and specifically the geared belt 212 is shown. Features of the two-part belt 300 illustrated in FIGS. 8-9 that are similar to the features of the two-part belt 200 illustrated in FIGS. 5-7 and 13A-13B will be identified by like numerals increased by a factor of one-hundred.

As illustrated in the second example embodiment of the geared belt 312, the top surface 312b is substantially planar. In this example embodiment, the central portion 315 has a central height 314 of between about 0.5 mm to about 4 mm. A central width 309, measured laterally between opposite sides of the geared belt 312, of the central portion 312b is between 0.2 mm-1 mm greater than a replacement width 307 of the replacement belt 305. In this example embodiment, the replacement belt 305 is attached via snap action, wherein the first looped portion (not shown) is centrally placed on the geared belt 212 over the first or second pulley 202, 204, and a force is exerted to stretch the replacement belt such that the replacement belt is centrally placed on the geared belt over the first or second pulley 202, 204.

Figure 10:
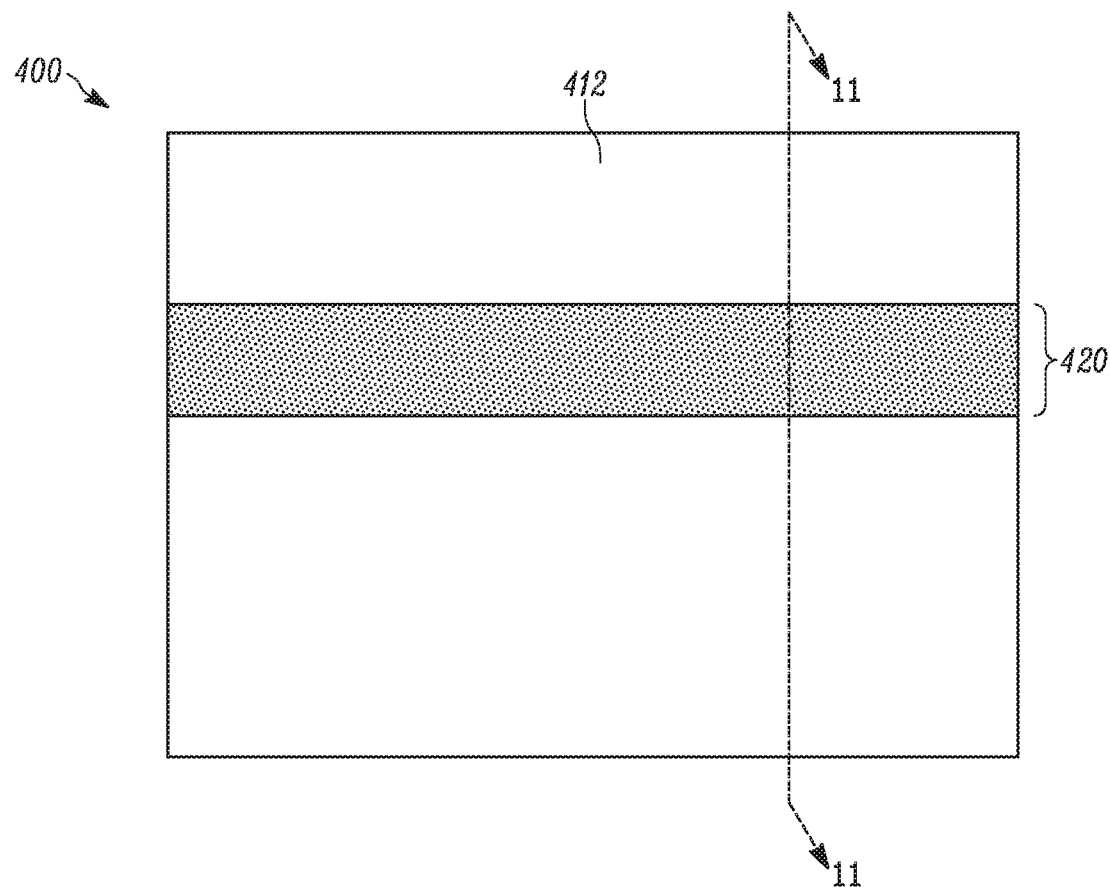
FIG. 10 is a top view of a replacement belt of FIG. 4 according to a third embodiment of the present disclosure.
Figure 11:
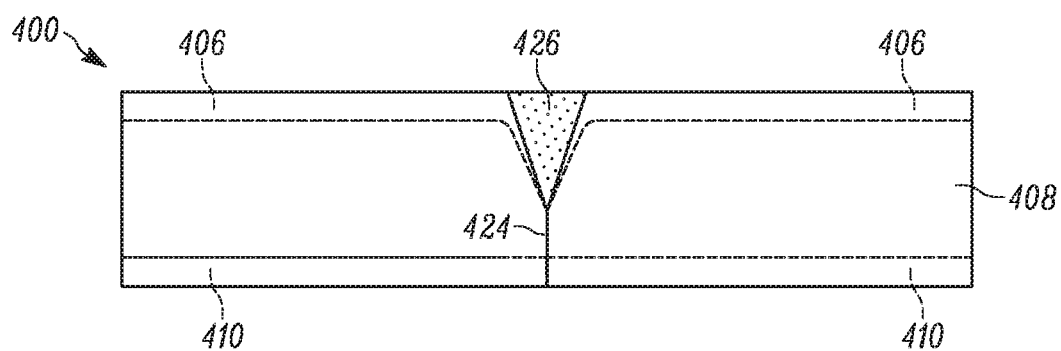
FIG. 11 a section view of FIG. 10 illustrating a replacement belt of the two-part conveyor belt taken along section lines 11-11 according to the third embodiment of the present disclosure.

Referring now to FIGS. 10-11, a third example embodiment of the two-part belt 200, and specifically the replacement belt 205 is shown. Features of the two-part belt 400 illustrated in FIGS. 10-11 that are similar to the features of the two-part belt 200 illustrated in FIGS. 5-7 and 13A-13B will be identified by like numerals increased by a factor of two-hundred, i.e. 400.

In the illustrated example embodiment of FIGS. 10-11, the replacement belt 405 comprises a jointed belt. In this example embodiment, material that comprises the replacement belt 405 can be cut to a desired length and bonded together at a joint 424 (e.g., as a butt splice, an adhesive bonding, a heat melt bonding, and/or physical bonding). In one example embodiment, a gap 420 resulting from the bonding is covered with a third adhesive resistant material 426 (e.g., a material that is resistant to bonding by the adhesive). The third adhesive resistant material 426 is a same or different material than the first and second adhesive resistant materials 406, 410. The third adhesive resistant material 426 is one of pushed into joint over the gap 420, melted into place, adhered into place, or the like. In another example embodiment, the gap 420 is left uncovered. Gap 420 can leave a small indent in the adhesive of the elongated spacer frame 201, however, as the indent will be on the peripheral wall 24 and does not affect the efficacy of the adhesive, such indents are negligible.

Figure 12:
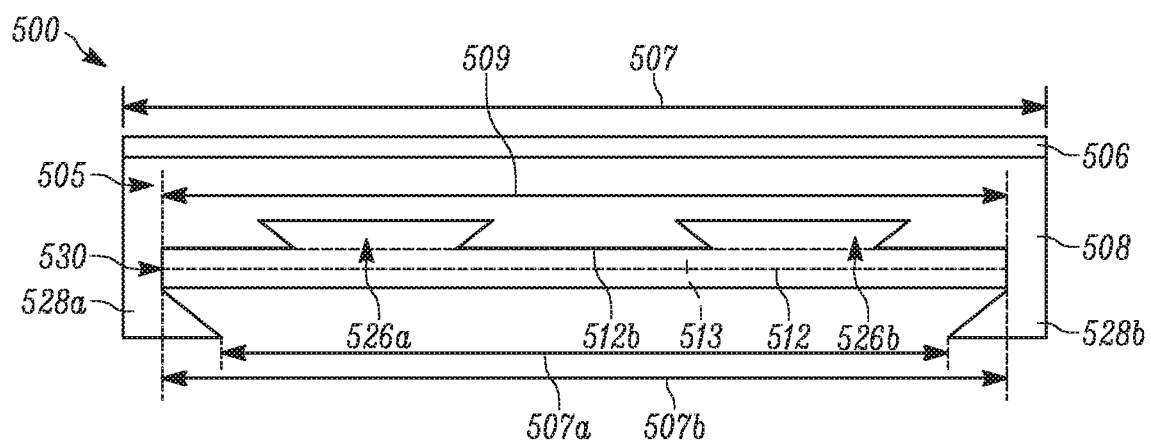
FIG. 12 is a section view of FIG. 4 taken along section lines 5-5 according to a fourth embodiment of the present disclosure.

Referring now to FIG. 12, a fourth example embodiment of the two-part belt 200, and specifically the replacement belt 205 is shown. Features of the two-part belt 500 illustrated in FIG. 12 that are similar to the features of the two-part belt 300 illustrated in FIGS. 8-9 will be identified by like numerals increased by a factor of two-hundred, i.e. 500.

In the illustrated example embodiment of FIG. 12, the replacement belt 505 comprises two retaining arms 528a, 528b, a belt notch 530, which houses the geared belt 512, and one or more flex notches 526a, 526b. The two retaining arms 528a, 528b are separated a retaining length 507a that is less than the central width 509, such that the arms prevent detachment of the replacement belt 505 from the geared belt 512. In this example embodiment, during attachment or removal of the replacement belt 505 from the geared belt 512, the two retaining arms 528a, 528b are flexed outwardly via the one or more flex notches 526a, 526b (e.g., which provide support for outward flexure of the retaining arms). Once the geared belt 512 is within the belt notch 530, the two retaining arms 528a, 528b return to their original position, such that at least a portion of the two retaining arms is underneath the geared belt. A notch width 507b of the belt notch 530 is between about 0.1 mm-0.5 mm greater than the central width 509 of the geared belt 512. It is contemplated that the second adhesive resistant material (not shown) is present on a side of the replacement belt 512 opposite the first adhesive resistant material 506.

In this example embodiment, the replacement belt 505 is attached by outwardly flexing the two retaining arms 528a, 528b to secure the replacement belt to the geared belt 512, wherein the first looped portion (not shown) is centrally placed on the geared belt 512 over the first or second pulley 202, 204, and a force is exerted to stretch the replacement belt such that the replacement belt secures the geared belt within the belt notch over the first or second pulley 202, 204.

Figure 18:
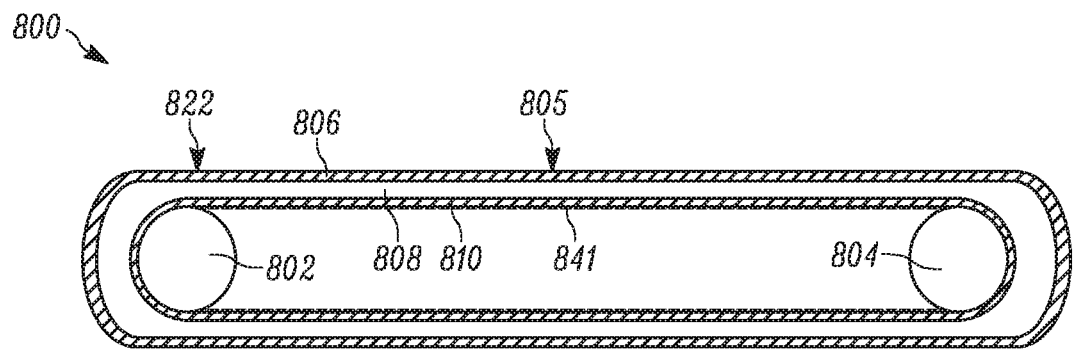
FIG. 18. is a schematic diagram of a reversible conveyor belt rotatably attached to two pulleys according to one example embodiment of the present disclosure.
Figure 19:
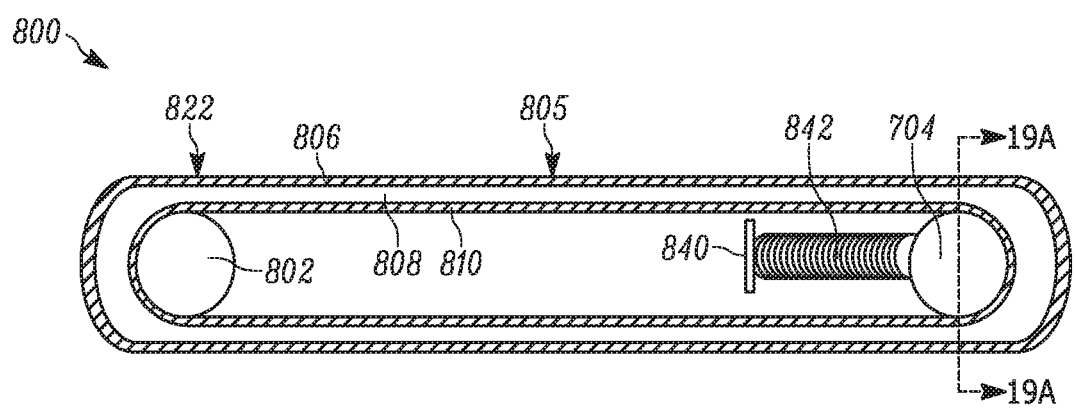
FIG. 19 is a schematic diagram of a reversible conveyor belt rotatably attached to two pulleys according to another example embodiment of the present disclosure.
Figure 19A:
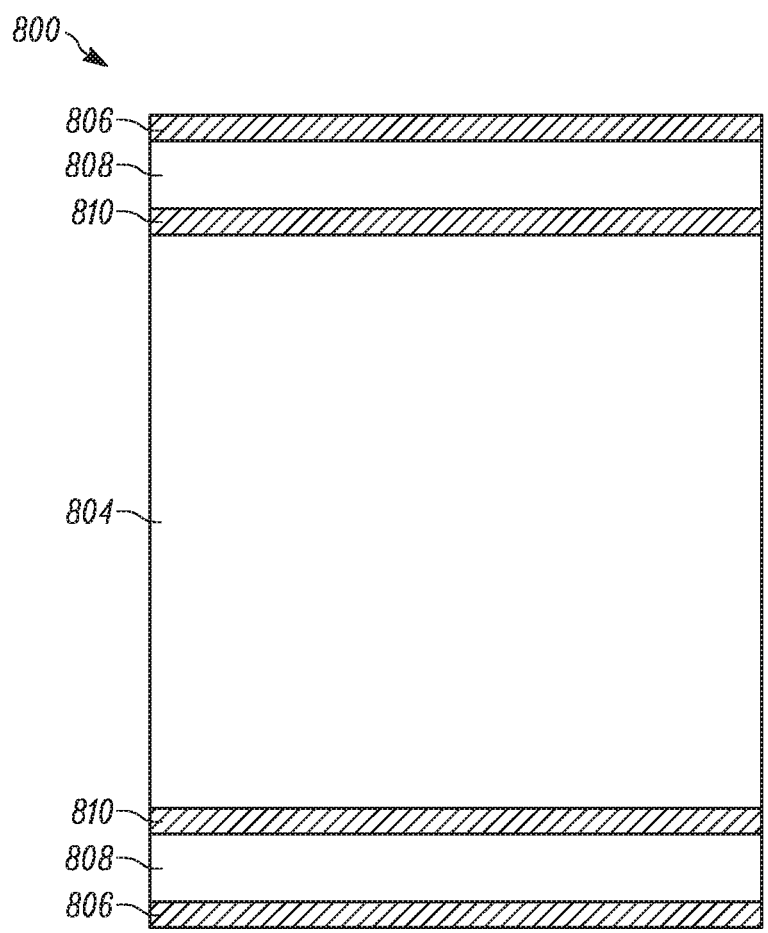
FIG. 19A a section view of a portion of FIG. 19 illustrating a reversible conveyor belt taken along section lines 19A-19A according to a fourth embodiment of the present disclosure.

Referring now to FIGS. 18-19A, a fourth example embodiment of conveyor belt 800 is illustrated, and specifically a reversible belt 805 directly in contact with first and second pulleys 802, 804. In this example embodiment, the reversible belt 805 comprises a substantially same configuration, materials, and features as the replacement belt 205 described above. Features of the conveyor belt 800 illustrated in FIGS. 18-19A that are similar to the features of the two-part belt 200 illustrated in FIGS. 5-7 and 13A-13B will be identified by like numerals increased by a factor of six-hundred, i.e. 800.

In the illustrated example embodiment of FIG. 18, the replacement belt 805 is removable from and re-attachable to the first and second pulleys 802, 804. In this example embodiment, a first looped portion (not shown) of the reversible belt 805 is centrally placed on the first or second pulley 802, 804 and a force is exerted to stretch the reversible belt 805 such that the reversible belt is centrally placed over the other of the first or second pulley. The reversible belt 805 is between 1% to 8% (the stretching or elastic strength allowing the belt to return to an unstressed state without any plastic deformation) undersized as compared to a perimeter length 841 around the first and second pulleys 802, 804. The elastic qualities and the undersized length will cause the reversible belt 805 to snap into place with sufficient tension to maintain the reversible belt's position relative to the first and second pulleys 802, 804.

As in the fourth example embodiment illustrated in FIG. 19, the replacement belt 805 is removable from and re-attachable to the first pulley 802 and the tension pulley 704 (see FIG. 13C). In this example embodiment, the reversible belt 805 is attached via snap action of the tension pulley 704, wherein the first looped portion (not shown) is centrally placed on the first pulley 802, a tension from the tension pulley 704 is removed, such as through removing a tension applied to the tension pulley from a tension device 842 attached to a stationary slat 840 (e.g., using a locking mechanism, such as a locking mechanism with a hand release). The tension device 842 and the stationary slat 840 are the same as discussed above with regard to the tension device 742 and the stationary slat 740. The removal of the tension reduces the perimeter length 841 (see FIG. 18) around and between the first pulley 802 and the tension pulley 704. A second looped portion (not shown) is centrally placed over the tension pulley 704 (e.g., that is decoupled from the tension device 842). The tension pulley 704 is re-coupled to the tension device 842 creating sufficient tension to maintain the reversible belt's 805 position relative to the first pulley 802 and the tension pulley 704. The reversible belt 805 is between 1% to 8% undersized as compared to the perimeter length 841 around the first and second pulleys 802, 804 when the tension from the tension pulley 704 is applied. In this example embodiment, the reversible belt 805 stretches to between 0.1% to about 8% of its original length responsive to an amount of force applied and returns to its original length absent the force. Further, the reversible belt 805 does not stretch due to use, such as being rotated with the pulleys 802, 704, 804, as the elasticity of the belt maintains a constant length of the belt during use.

In the illustrated example embodiment of FIGS. 18-19A, the reversible belt 805 comprises one of a jointed belt or an endless belt (without a seam formed over a drum or mandrel) was described above with regard to the replacement belt 205. The reversible belt 805 comprises both first and second adhesive resistant materials 806, 810. Stated another way, responsive to the first adhesive resistant material 806 undergoing adhesive exhaustion the replacement belt 805 can be removed from the first and second pulleys 802, 804 and/or tension pulley 704 and reversed, such that the first adhesive resistant material is in contact with the first and second pulleys and/or tension pulley and the second adhesive material 810, which has not been repeatedly exposed to adhesive, and is not exhausted, faces outwardly and supports and moves the elongated spacer frame 201.

Figure 20A:
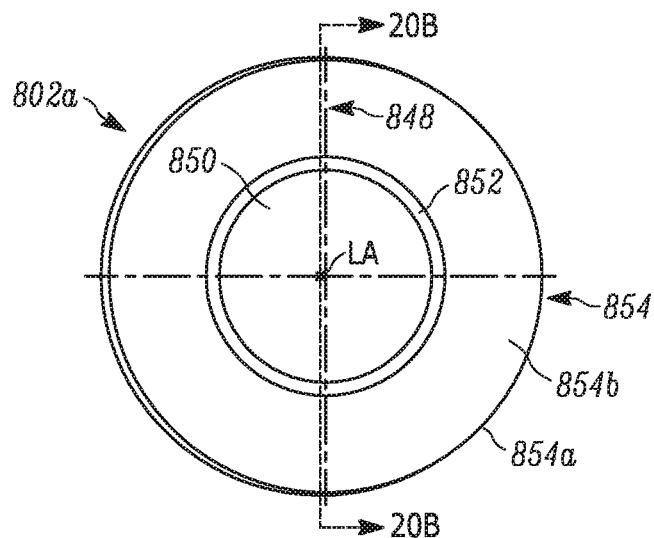
FIG. 20A is a side elevation view of a first embodiment of a pulley according to one example embodiment of the present disclosure.
Figure 20B:
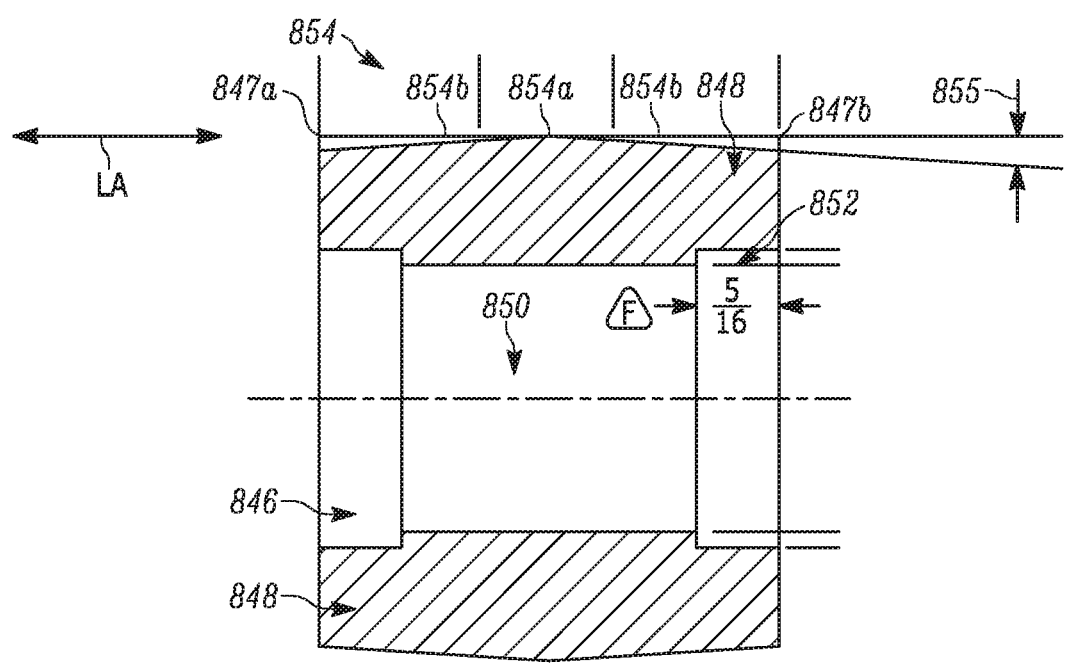
FIG. 20B a section view of FIG. 20A illustrating a first embodiment of a pulley taken along section lines 20B-20B according to one example embodiment of the present disclosure.

Illustrated in FIGS. 20A and 20B, a first example embodiment of the first and second pulleys 802, 804 and/or the tension pulley 704, collectively the pulley 802a, is illustrated (the tension pulley 704 is one of the same or different than the first and second pulleys). In the illustrated example embodiment, the pulley 802a extends along a lateral axis (LA). The pulley 802a has an exterior surface 854 with which the reversible belt 805 interacts, a centrally located bore 850 between and adjacent to two outwardly facing counter bores 852, 846. The exterior surface 854 comprises a central point crown 854a and ramps 845b extending away and downward relative to the central point crown along the lateral axis (LA). Stated another way, a first diameter of the pulley 802a measured around the central point crown 854a is greater than a second diameter of the pulley measured around a first or second outward edge 857a, 857b. An angle of dissent 855 between the central point crown 854a and the first or second outward edge 857a, 857b is between 1° to about 15°.

Figure 21A:
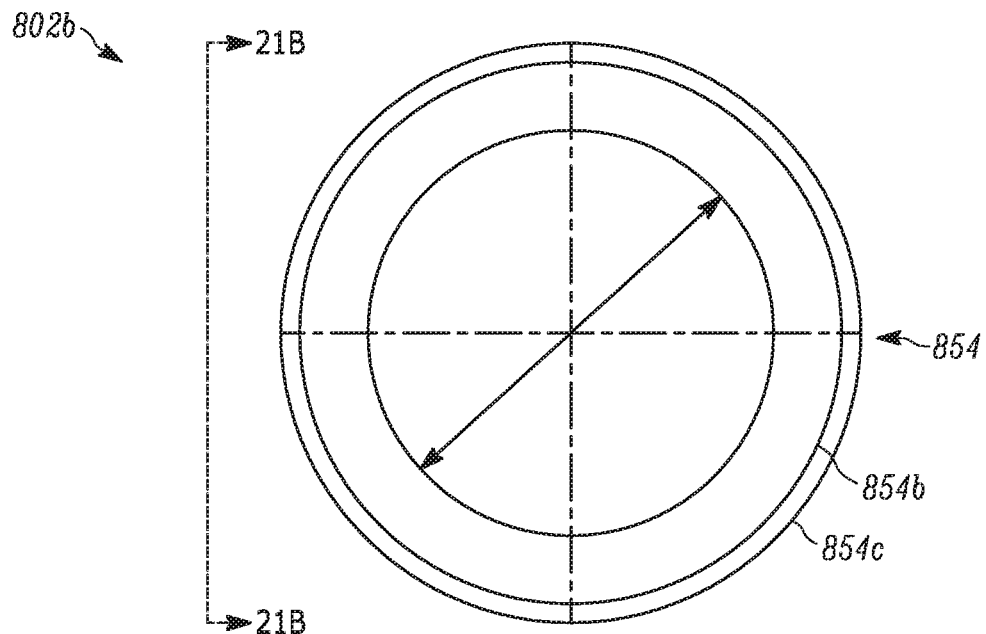
FIG. 21A is a side elevation view of a second embodiment of a pulley according to one example embodiment of the present disclosure.
Figure 21B:
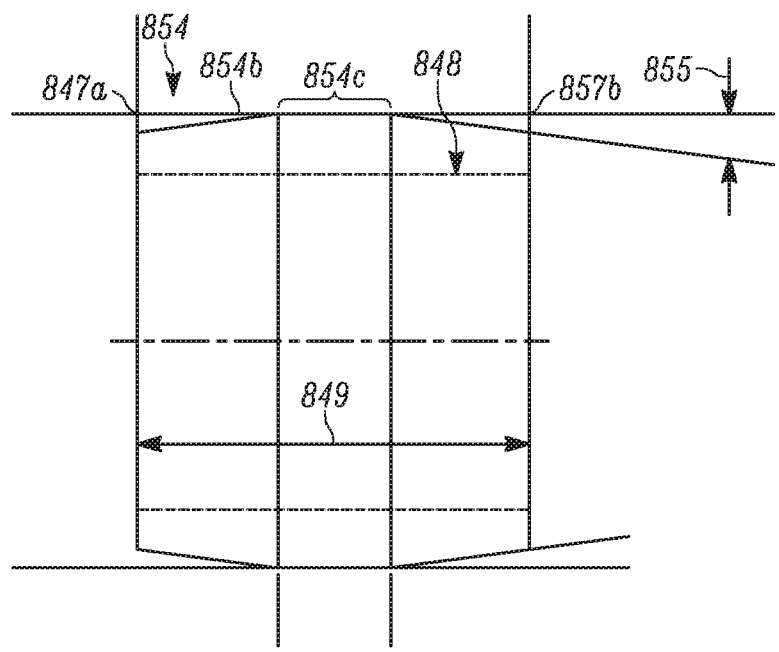
FIG. 21B a section view of FIG. 21A illustrating a second embodiment of a pulley taken along section lines 21B-21B according to one example embodiment of the present disclosure.

Illustrated in FIGS. 21A and 21B, a second example embodiment of the first and second pulleys 802, 804 and/or the tension pulley 704, collectively the pulley 802b, is illustrated. The pulley 802b is substantially the same as the pulley 802a, except that the central point crown 854a is replaced with a central area crown 854c, wherein the central area crown 854c extends between 15%-50% of the total pulley width 849. The central area crown 854c has a constant first diameter, wherein ramps 845b extend away and downward relative to the central area crown. The larger diameter of the central point crown 854a, and the central area crown 854c maintains the reversible belt 805 in a central location during use.

Figure 22A:
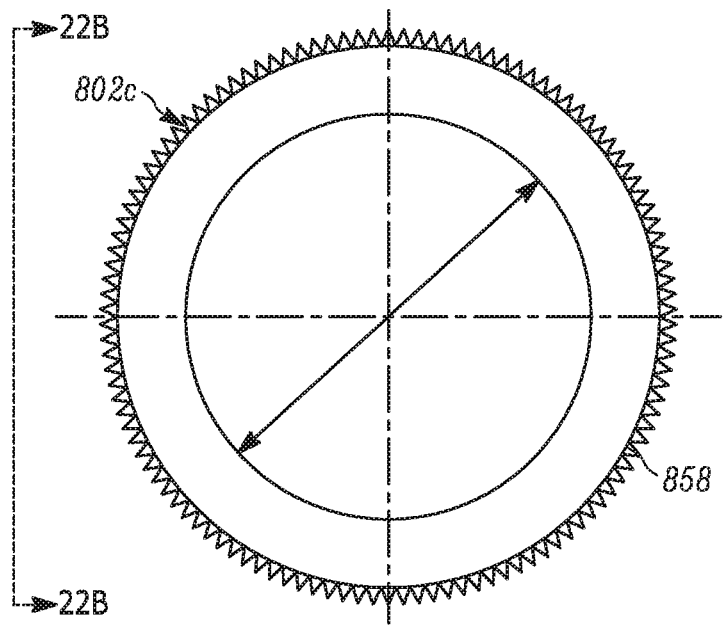
FIG. 22A is a side elevation view of a third embodiment of a pulley according to one example embodiment of the present disclosure.
Figure 22B:
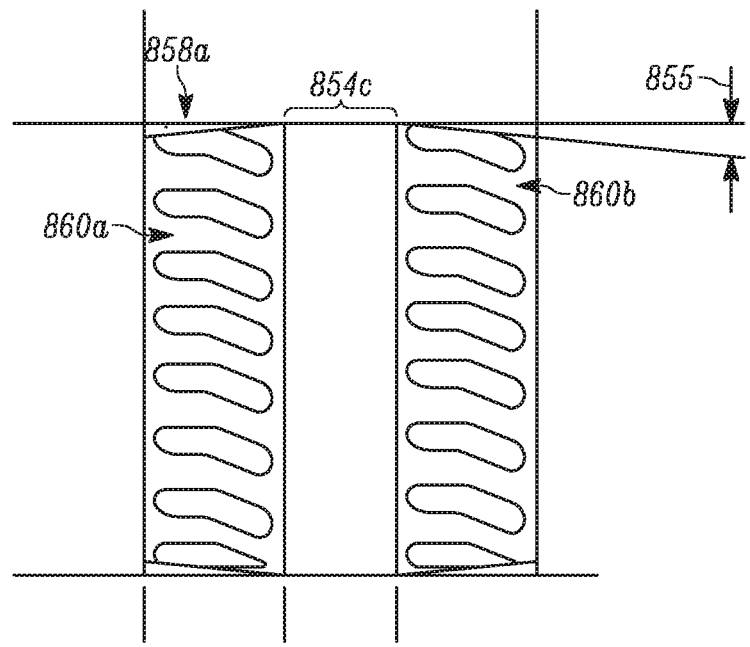
FIG. 22B a side view of FIG. 22A illustrating a third embodiment of a pulley viewed along section lines 21B-21B according to one example embodiment of the present disclosure.

Illustrated in FIGS. 22A and 22B, a third example embodiment of the first and second pulleys 802, 804 and/or the tension pulley 704, collectively the pulley 802c, is illustrated. The pulley 802c is substantially the same as the pulley 802a, except that along the ramps 845b one or more treads are spaced laterally from each other by the central area crown 854c. It would be appreciated by one having ordinary skill in the art that other tread configurations are contemplated, including pulleys without a crown portion, a pulley with the central point crown 854a, etc.

In yet another example embodiment, an endless annular belt 800 is provided for use in applying sealant to spacer frames 201 to be used in the assembly of windows or doors. The belt 800 comprises an endless and seamless annular loop (see FIG. 18) forming the belt, the loop has first and second sides 806 and 810, respectively for traveling over at least one pulley (802 and/or 804) during use. The first side 806 provides a first side contact surface (see FIG. 18) that supports and transports a spacer frame as an adhesive or sealant (such as butyl) is applied. The second side provides a second contact surface (see FIG. 18) for engaging at least one pulley. The endless annular belt 800 is advantageously constructed such that the endless annular belt can be reversed (or two-tooled) after time and/or wear such that either side operates effectively both when driven by a pulley (such that slippage is minimized and/or prevented) and providing a surface that resist attachment sealant or adhesive from sticking to the belt after it is applied spacer frame. Since the endless annular belt 800 has the advantageous two-tooled construction, the life of the belt is doubled.

The first and second contact surfaces 806 and 810 are spaced by an annular support layer 808 centrally disposed between the surfaces. The support layer 808 is integrally molded with the first and second contact surfaces, wherein the support layer comprises a first material (808) and the first and second contact surfaces comprise a second material (806 and 810), wherein the first material (808) is different from the second material (806 and 810).

In one example embodiment, the first material (808) forming the support layer 808 is one of a polymer and rubber and the second material (806 and 810) is an adhesive resistant material. Some suitable examples of the support layer 808 first material (808) include one of polyethylene and urethane with or without an integrated woven fiber mesh made from fiber cords made from a material such as polyester or Kevlar (polyparaphenylene terephthalamide) to achieve a predictable amount of elasticity having a thickness between 0.25 and 2.0 mm and preferably between 0.5 and 1.0 mm a durometer ranging between 40 and 70 on a Shore A scale and preferably a durometer ranging between 45 and 55 on a Shore A scale.

One suitable example of an adhesive resistant material or second material (806 and 810) is silicone. In another example embodiment, the silicone forming the adhesive resistant material (806 and 810) is between 0.5 and 3.0 mm thick and is preferably between 0.75 and 1.5 mm thick.

In another example embodiment, the endless annular belt 800 is formed by the first and second materials (808) and (806 and 810), respectively being concurrently molded together to be integrally connected. That is, the integral connection is such that separation is not possible without destruction of the endless annular belt 800. The molding process occurs over a mandrel or drum such that the belt is seamless, having no beginning or end.

The various embodiments of the conveyor belt 800 allow users of the conveyor belt system 100 to reduce cost by reversing the reversible belt 805, rather than replacing the conveyor belt. The reversible belt 805 additionally increases the ease of changing a belt, rather than removing the pulleys 202, 204 to remove the gear belt 212, 312, 412, and 512, the reversible belt 805 is simply snapped onto the pulleys 802, 804, 704, without a user having to remove the pulleys. Further, the reversible belt 805 has less material and less structural requirements as compared to the gear belt 212, 312, 412, and 512 and thus requires less materials and less technical and constructive effort to generate. Furthermore, the double-sided nature of the reversible belt 805 doubles the average functional lifetime of a single belt since both sides can be used.

The various embodiments of the two-part belt 200, 300, 400, and 500 allow users of the conveyor belt system 100 to reduce cost by replacing merely the replacement belt 205, 305, 405, and 505, rather than replacing the gear belt 212, 312, 412, and 512, which is reinforced, self-tracking, and non-stretch. The replacement belt 205, 305, 405, and 505 additionally increases the ease of changing a belt, rather than removing the pulleys 202, 204 to remove the gear belt 212, 312, 412, and 512, the replacement belt 205, 305, 405, and 505 is simply snapped onto the gear belt, without a user having to remove the pulleys. Further, the replacement belt 205, 305, 405, and 505 has less material and less structural requirements as compared to the gear belt 212, 312, 412, and 512 and thus requires less materials and less technical and constructive effort to generate. Additionally, the double-sided nature of the replacement belt 205, 305, 405, and 505 doubles the average functional lifetime of a single belt since both sides can be used.

In the foregoing specification, specific embodiments have been described. However, one of ordinary skill in the art appreciates that various modifications and changes can be made without departing from the scope of the disclosure as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The disclosure is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art. In one non-limiting embodiment the terms are defined to be within for example 10%, in another possible embodiment within 5%, in another possible embodiment within 1%, and in another possible embodiment within 0.5%. The term "coupled" as used herein is defined as connected or in contact either temporarily or permanently, although not necessarily directly and not necessarily mechanically. A device or structure that is "configured" in a certain way is configured in at least that way, but may also be configured in ways that are not listed.

To the extent that the materials for any of the foregoing embodiments or components thereof are not specified, it is to be appreciated that suitable materials would be known by one of ordinary skill in the art for the intended purposes.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. An endless annular belt for use in applying sealant to spacer frames to be used in the assembly of windows or doors, the endless annular belt comprising:
   an endless and seamless annular loop forming the endless annular belt, the loop having first and second sides for traveling over at least one pulley during use;
   said first side providing a first side contact surface and said second side providing a second contact surface, said first and second side contact surfaces providing a two-tooled construction for said endless annular belt such that said first and second side contact surfaces can be used independently during operation;
   said first and second contact surfaces being spaced by an annular support layer centrally disposed between said surfaces, the support layer being integrally molded with said first and second contact surfaces, wherein said support layer comprises a first material and said first and second contact surfaces comprise a second material, wherein said first material is different from said second material, wherein said first material comprising said support layer is one of a polymer and rubber.

2. The endless annular belt of claim 1, wherein said second material is an adhesive resistant material.

3. The endless annular belt of claim 2 wherein said adhesive resistant material is at least one of silicone and polytetrafluoroethylene.

4. The endless annular belt of claim 3 wherein said first and second contact surfaces are formed of silicone having a thickness ranging between 0.5 and 3.0 mm.

5. The endless annular belt of claim 1 wherein said first material is one of polyethylene and urethane having a thickness between 0.25 and 2.0 mm.

6. The endless annular belt of claim 1 wherein said first and second materials are concurrently molded together to be integrally formed such that separation is not possible without destruction of the endless annular belt, the molding process occurring over a mandrel such that said belt is seamless.

7. The endless annular belt of claim 1 further wherein said first material further comprises fiber cords to control and predict the elasticity of said belt.

8. The endless annular belt of claim 7, wherein the endless annular belt is removable attachable to a first rotatable pulley and a second rotatable pulley, the first and second rotatable pulleys defining a rotation path having a first perimeter length, the endless annular belt having a second perimeter length that is shorter than the first perimeter length the first perimeter length is between about 1% to 8% larger than the second perimeter length.

9. The endless annular belt of claim 1, wherein elastic support layer comprises at least one of polyethylene and urethane further comprising an integrated woven fiber mesh, the integrated woven fiber mesh comprising one of polyester or phenylene terephthalamide.

10. A conveyor belt system for use in applying sealant to an elongated spacer frame comprising:
    a first rotatable pulley and a second rotatable pulley defining a rotation path around the first and second rotatable pulleys, the rotation path having a first perimeter length;
    a reversible belt for supporting and transporting an elongated spacer frame along a linear path when attached to the first and second pulleys during use, the reversible belt removably attachable to the first and second pulleys, wherein responsive to being attached, the reversible belt is rotatably attached to the first and second pulleys, wherein the reversible belt comprises first and second sides configured to be in contact with the first and second pulleys, the first side comprising a first adhesive resistant material and a second side comprising a second adhesive resistant material, the first and second adhesive resistant materials are separated by an elastic support layer, wherein the reversible belt comprises a second perimeter length that is shorter than the first perimeter length, further wherein the elastic support layer is configured to apply a force to the first and second pulleys such that the reversible belt does not slip relative to the first and second pulleys when in use.

11. The conveyor belt system of claim 10, wherein the linear path extends opposite one or more sealant applicators.

12. The conveyor belt system of claim 11, wherein the reversible belt comprises an endless belt.

13. The conveyor belt system of claim 10, wherein the reversible belt comprises a first elasticity and wherein the first perimeter length is between about 1% to 8% larger than the second perimeter length.

14. The conveyor belt system of claim 10, wherein the first and second adhesive resistant materials are integrally formed with the elastic support layer.

15. The conveyor belt system of claim 10, wherein elastic support layer comprises at least one of polyethylene and urethane.

16. The conveyor belt system of claim 10, wherein elastic support layer comprises at least one of polyethylene and urethane further comprising an integrated woven fiber mesh, the integrated woven fiber mesh comprising one of polyester or phenylene terephthalamide.

17. The conveyor belt system of claim 10, wherein said first and second adhesive resistant materials are formed of at least one of silicone and polytetrafluoroethylene having a thickness ranging between 0.5 and 3.0 mm.

18. A method of forming a conveyor belt system for use in applying sealant to an elongated spacer frame, the method comprising:
forming an elastic support layer;
integrally forming a reversible belt having a first and second adhesive resistant materials separated by the elastic support layer, the first adhesive resistant material on a first side of the elastic support layer and the second adhesive resistant material on a second side of the elastic support layer, the reversible belt removably attachable to first and second pulleys, wherein responsive to being attached, the reversible belt is rotatably attached to the first and second pulleys, wherein the first side is in contact with the first and second pulleys, further the reversible belt for supporting and transporting an elongated spacer frame on the reversible belt along a linear path when attached to the first and second pulleys during use.

19. The method of claim 18, the integrally forming a reversible belt comprising forming the reversible belt by at least one co-extrusion, molding, mandrel cut, and endless manufacturing.

20. An endless annular belt for use in applying sealant to spacer frames to be used in the assembly of windows or doors, the endless annular belt comprising:
an endless and seamless annular loop forming the endless annular belt, the loop having first and second sides for traveling over at least one pulley during use;
said first side providing a first side contact surface and said second side providing a second contact surface, said first and second side contact surfaces providing a two-tooled construction for said endless annular belt such that said first and second side contact surfaces can be used independently during operation;
said first and second contact surfaces being spaced by an annular support layer centrally disposed between said surfaces, the support layer being integrally molded with said first and second contact surfaces, wherein said support layer comprises a first material and said first and second contact surfaces comprise a second material, wherein said first material is different from said second material, wherein said first material is one of polyethylene and urethane.

21. The endless annular belt of claim 20 said first material having a thickness between 0.25 and 2.0 mm.

22. An endless annular belt for use in applying sealant to spacer frames to be used in the assembly of windows or doors, the endless annular belt comprising:
an endless and seamless annular loop forming the endless annular belt, the loop having first and second sides for traveling over at least one pulley during use;
said first side providing a first side contact surface and said second side providing a second contact surface, said first and second side contact surfaces providing a two-tooled construction for said endless annular belt such that said first and second side contact surfaces can be used independently during operation;
said first and second contact surfaces being spaced by an annular support layer centrally disposed between said surfaces, the support layer being integrally molded with said first and second contact surfaces, wherein said support layer comprises a first material and said first and second contact surfaces comprise a second material, wherein said first material is different from said second material, wherein the annular support layer comprises at least one of polyethylene and urethane further comprising an integrated woven fiber mesh, the integrated woven fiber mesh comprising one of polyester or phenylene terephthalamide.

* * * * *